United States Patent Office 3,637,666
Patented Jan. 25, 1972

3,637,666
2-ANDROSTENE-17-ETHERS AND PROCESS FOR THE PREPARATION THEREOF
Klaus Irmscher, Gerhard Cimbollek, Helmut Wahlig, Karl-Otto Freisberg, Herbert Nowak, and Andreas Garbe, all of 250 Frankfurter Str., 6100 Darmstadt, Germany
No Drawing. Filed Apr. 8, 1970, Ser. No. 26,784
Int. Cl. C07c *173/00*
U.S. Cl. 260—239.5                      21 Claims

ABSTRACT OF THE DISCLOSURE 2-androstene-17-ethers of the formula

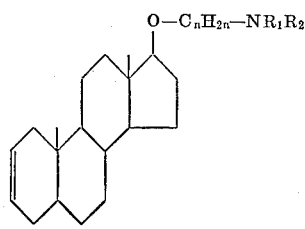

wherein $n$ is 2, 3 or 4 and $R_1$ and $R_2$ each are alkyl of 1 to 3 carbon atoms or, collectively with the amino nitrogen atom, pyrrolidino, piperidino, hexamethylenimino, piperazino or morpholino, have cholesterol blood-level lowering activity, anti-fungal and anti-bacterial activity and steroidal hormonal activity.

BACKGROUND OF THE INVENTION

This invention relates to novel 17-ethers of 2-androsten-17-ol and to methods for their production and use.

SUMMARY OF THE INVENTION 2-androstene-17-ethers of the formula

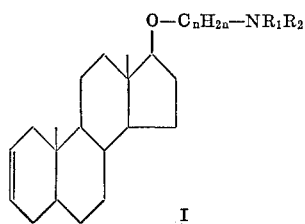

wherein $n$ is 2, 3, or 4 and $R_1$ and $R_2$, which can be identical or different, each are alkyl of 1 to 3 carbon atoms or, colllectively with the nitrogen atom, a pyrrolidino, piperidino, hexamethylenimino, piperazino, or morpholino group, and the physiologically acceptable acid addition salts thereof exhibit, with a good physiological compatibility, cholesterol blood-level-lowering effects, estrogenic, anti-estrogenic, and anti-fertility activity, as well as anti-fungal, i.e., fungistatic or fungicidal (antimycotic) activity, anti-bacterial, i.e., bacteriostatic and bactericidal, activity.

DETAILED DISCUSSION

Of the compounds of this invention defined by Formula I, preferred are the following, including the physiologically acceptable acid addition salts thereof:

(Ia) those wherein $n$ is 2 or 3;
(Ib) those wherein $n$ is 2 or 3 and —$NR_1R_2$ is dimethylamino, diethylamino, pyrrolidino, piperidino, hexamethylenimino or morpholino; and
(Ic) those wherein $n$ is 2 or 3 and —$NR_1R_2$ is dimethylamino or diethylamino.

The novel compounds of general Formulae I, Ia, Ib and Ic, and the acid addition salts thereof can be prepared by several methods. In one such method, a steroid of Formula II is reacted with an amine of Formula III:

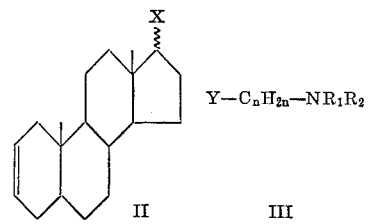

wherein $n$, $R_1$ and $R_2$ have the values given above and X and Y each represent OH or a functionally modified OH-group, and one of X and Y also can be Cl, Br, I.

In another method, a compound of Formula IV

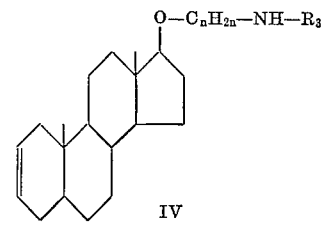

wherein $R_3$ is H or alkyl of 1 to 3 carbon atoms, and $n$ has the values given above is treated with an alkylating agent.

In still another method, a compound of Formula V is reacted with an amine of the Formula VI:

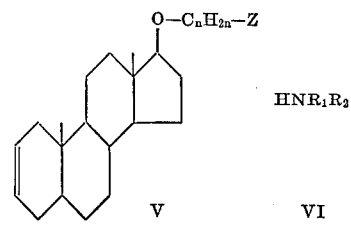

wherein Z is an OH-group or a functionally modified OH-group, or Cl, Br or I, and $n$, $R_1$ and $R_2$ have the values given above.

In a further process, a compound which otherwise corresponds to Formula I but wherein at least one reducible group is present in place of one or more hydrogen atoms, is treated with a reducing agent.

In still a further process, a compound of Formula VII

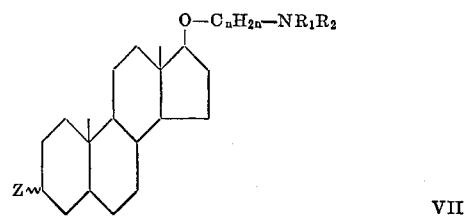

wherein Z, $n$, $R_1$ and $R_2$ have the values given above is treated with an agent which splits off HZ.

In any of of the above processes in which a free base of Formula I is produced, the base can be converted into a physiologically acceptable acid addition salt by treatment with an acid and/or a free base of Formula I can be produced from one of the acid addition salts thereof by treatment with a stronger base.

In the compounds of Formulae I, III, IV, V and VII, the group —$C_nH_{2n}$— preferably is —$(CH_2)_n$—, viz, —CH$_2$CH$_2$—, —CH$_2$CH$_2$CH$_2$— or —CH$_2$CH$_2$CH$_2$CH$_2$—
but also can be, e.g., —CH(CH$_3$)—, —CH(CH$_3$)CH$_2$—

—CH$_2$CH(CH$_3$)—, —CH(C$_2$H$_5$)—

—CH(CH$_3$)CH$_2$CH$_2$—, —CH$_2$CH(CH$_3$)CH$_2$—

—CH$_2$CH$_2$CH(CH$_3$)—, —CH(C$_2$H$_5$)CH$_2$—

—CH$_2$CH(C$_2$H$_5$)—, —CH(n-C$_3$H$_7$)— or

—CH(iso-C$_3$H$_7$)—

In the compounds of Formulae II, III, V and VII, the groups X, Y, and Z can, in addition to Cl, Br, I and free OH-groups, also be functionally modified OH groups. Such groups are, e.g., esterified-OH, particularly "reactively" esterified OH-groups such as, for example, an ester of a sulfonic acid, e.g., of 1–10 carbon atoms, including methane-, ethane-, benzene-, p-toluene-, and naphthalenesulfonic acid esters; an ester of a carboxylic acid, e.g., of 1–18, preferably 1–7 carbon atoms, such as, for example, of a fatty acid, including formic acid, acetic acid, propionic acid, butyric acid, isobutyric acid, valeric acid, isovaleric acid, trimethylacetic acid, caproic acid, isocaproic acid, enanthic acid, caprylic acid, pelargonic acid, capric acid, lauric acid, myristic acid, palmitic acid, stearic acid; also crotonic acid, oleic acid, cyclohexanecarboxylic acid, cyclohexylacetic and -propionic acid, benzoic acid, phenylacetic and -propionic acid, picolinic acid, nicotinic acid, isonicotinic acid, and furane-2-carboxylic acid.

The wavy line in the 17-position of the compounds of Formula II means that the substituent X can have the α- or β-configuration. Examples of substituents in the α-position are Cl, Br, I, as well as sulfonic acid ester groups, for example, p-toluenesulfonyloxy. In these cases, a Walden inversion occurs during the reaction with the amine III, and the desired 17β-ethers are obtained.

The substituent Z in the compounds of Formula VII can likewise be in the α- or β-position. Those wherein Z is in the β-position are preferred, as they are more readily prepared.

The 2-androstene-17-ethers of Formula I can be produced by reacting the compounds of Formula II with compounds of Formula III wherein, e.g., both are alcohols or one is an alcohol and the other a reactive ester. Preferred starting compounds of Formula II are, if the etherification reaction takes place without a Walden inversion, 2-androsten-17β-ol and reactive-17-esters thereof, e.g., 17-methanesulfonate, 17-benzenesulfonate, 17-p-toluenesulfonate. Others are 17β-chloro-2-androstene, 17β-bromo-2-androstene and 17β-iodo-2-androstene. If the etherification reaction takes place with Walden inversion, the corresponding 17α-epimers preferably are employed as starting compounds.

Preferred starting compounds of Formula III are those of the following formulae:

Y—(CH$_2$)$_n$—NR$_1$R$_2$ (IIIa); Y—(CH$_2$)$_n$—Q$_1$ (IIIb); and Y—(CH$_2$)$_n$—Q$_2$ (IIIc), wherein Q$_1$ is dimethylamino, diethylamino, pyrrolidino, piperidino, hexamethylenimino or morpholino, Q$_2$ is dimethylamino or diethylamino, n is 2 or 3 and Y, R$_1$ and R$_2$ have the values given above. Specific examples are 2-dimethylaminoethanol,
2-diethylaminoethanol,
2-di-n-propylaminoethanol,
2-diisopropylaminoethanol,
2-pyrrolidinoethanol,
2-piperidinoethanol,
2-hexamethyleniminoethanol,
2-morpholinoethanol,
2-piperazinoethanol,
3-dimethylaminopropanol,
3-diethylaminopropanol,
3-di-n-propylaminopropanol,
3-diisopropylaminopropanol,
3-pyrrolidinopropanol,
3-piperidinopropanol,
3-hexamethyleniminopropanol,
3-morpholinopropanol,
3-piperazinopropanol,
1-methyl-2-dimethylaminoethanol,
1-methyl-2-diethylaminoethanol,
1-methyl-2-morpholinoethanol,
4-dimethylaminobutanol,
4-diethylaminobutanol,
2-methyl-3-dimethylaminopropanol, and the corresponding chlorides, bromides, iodides, methanesulfonates, benzenesulfonates, and p-toluenesulfonates. Suitably, the etherification is conducted in the presence of a condensation agent, for example, alkali metal hydroxides and alcoholate-forming compounds, such as alkali metals, e.g., Na, K or Li in liquid ammonia; alkali metal hydrides, preferably NaH; alkali-metal amides, preferably NaNH$_2$; and organometallic compounds, e.g., CH$_3$Li. Other suitable condensation agents are halogen ion acceptors, e.g., lead salts or silver compounds, e.g., Ag$_2$O, Ag$_2$CO$_3$, AgOOCCH$_3$, AgNO$_3$, AgClO$_4$, and AgBF$_4$. When the starting materials are both alcohols, the condensation agent employed is a dehydration agent, e.g., aluminum oxide, sulfuric acid or an acidic salt of sulfuric acid, e.g., KHSO$_4$, boric acid, or an organic sulfonic acid, e.g., p-toluenesulfonic acid.

It is advantageous to conduct the reaction in the presence of a solvent. Solvents which can be employed include the hydrocarbons, e.g., cyclohexane, benzene, toluene and xylene, ethers, e.g., diethyl ether, diisopropyl ether, tetrahydrofuran, dioxane. Other suitable solvents are acetonitrile, acetone, nitromethane, dimethylformamide, dimethyl sulfoxide, liquid ammonia and mixtures of the above-mentioned solvents. When the reaction is carried out under dehydrating conditions, it is advantageous to use solvents which can be used to remove the water formed during the reaction by azeotropic distillation, e.g., benzene or toluene.

The formation of the alcoholate can also be conducted in liquid ammonia. The liquid ammonia is thereafter removed and the reaction is then conducted in the presence of one of the above-mentioned higher-boiling solvents. It is also possible to employ an excess of compound III, for example an amino-alcohol, as the solvent.

When a reactive ester of Formula II (X=Cl, Br, I or functionally modified OH) is employed for the etherification reaction, a Walden inversion normally occurs during the reaction on the C$_{(17)}$-atom carrying the reactive group. In order to prepare a compound of Formula I it is, therefore, advantageous to start with 2-androsten-17β-ol, if it is desired to react the free steroid alcohol of Formula II (X=OH) with an aminoalcohol III (Y=OH) or one of its reactive esters. In contrast thereto, if a reactive ester of Formula II (X=Cl, Br, I or functionally modified OH) is employed, the corresponding derivatives of 2-androsten-17α-ol are advantageously utilized.

All of the above processes used for the etherification step employ procedures described in the literature, for example in Houben-Weyl, "Methoden der organischen Chemie" [Methods of Organic Chemistry], vol. 3, pp. 132–169.

The tertiary amino ethers of Formula I can also be prepared from the corresponding primary or secondary amines by alkylation. For example, a primary or secondary amine of Formula IV can be reacted with alkylation agents, for example alkyl halides. Examples of steroid amines of Formula IV are 17β-(2-aminoethoxy)-2-androstene,
17β-(2-methylaminoethoxy)-2-androstene,
17β-(2-ethylaminoethoxy)-2-androstene,
17β-(2-n-propylaminoethoxy)-2-androstene,
17β-(2-isopropylaminoethoxy)-2-androstene,
17β-(3-aminopropoxy)-2-androstene, 17β-(1-methyl-2-aminoethoxy)-2-androstene,
17β-(4-aminobutoxy)-2-androstene,
17β-(2-methyl-3-aminopropoxy)-2-androstene.

Suitable alkylation agents are, for example, methyl chloride, bromide, and iodide; dimethyl sulfate; ethyl chloride, bromide, and iodide; diethyl sulfate; n-propyl chloride, bromide, and iodide; isopropyl chloride, bromide and iodide; 1,4-dichlorobutane, 1,4-dibromobutane, 1,4-diiodobutane, 1,5-dichloropentane, 1,5-dibromopentane, 1,5-diiodopentane, 1,6-dichlorohexane, 1,6-dibromohexane, 1,6-diiodohexane; bis(2-chloroethyl)amine, bis(2-bromoethyl)amine, bis(2 - iodoethyl)amine, bis(2 - chloroethyl) ether, bis(2-bromoethyl) ether, bis(2-iodoethyl) ether. Other suitable alkylation agents are the free alcohols, for example methanol, ethanol, propanol, isopropanol, 1,4-butanediol, 1,5-pentanediol, 1,6-hexanediol, diethanolamine, diethylene glycol, and the reactive esters thereof, e.g., the methanesulfonates, benzenesulfonates, and p-toluensulfonates.

The tertiary amines of Formula I can also be produced by alkylating the corresponding secondary aliphatic amines of Formula VI with a hydroxyalkoxy steroid (V), (Z=OH), or a reactive derivative thereof.

Representative hydroxy alkoxy steroids (V) are

17β-(2-hydroxyethoxy)-2-androstene,
17β-(3-hydroxypropoxy)-2-androstene,
17β-(4-hydroxybutoxy)-2-androstene,
17β-(1-methyl-2-hydroxyethoxy)-2-androstene,
17β-(2-methyl-3-hydroxypropoxy)-2-androstene, as well as the corresponding reactive esters, for example 17β-(2-chloroethoxy)-2-androstene,
17β-(2-bromoethoxy)-2-androstene,
17β-(2-iodoethoxy)-2-androstene,
17β-(2-p-toluenesulfonyloxyethoxy)-2-androstene.

Representative amines of Formula VI are dimethylamine, diethylamine, di-n-propylamine, diisopropylamine, N - methyl - N - ethylamine, N-methyl-N-n-propylamine, N-methyl - N - isopropylamine, N-ethyl-N-n-propylamine, N-ethyl-N-isopropylamine, N-n-propyl-N-isopropylamine, pyrrolidine, piperidine, hexamethylenimine, piperazine and morpholine.

In the above-described alkylation reactions, a secondary amine is suitably employed in excess, whereas a primary amine is advantageously used in an about stoichiometric amount. In case the alkylation is conducted with a halogenide, sulfate, or sulfonic acid ester, a strong base can be added for neutralizing the thus-formed acid, for example NaOH or KOH, $Na_2CO_3$ or $K_2CO_3$, a silver salt, an alkali-metal hydride, or alkali-metal amide. Other suitable condensation agents are neutral salts and ammonium salts, e.g., LiBr, NaBr, $NaNO_3$, $NH_4Cl$, $Ca(NO_3)_2$, $Sr(NO_3)_2$, and copper salts. When a bromide or chloride is employed, the reaction can be accelerated by the addition of NaI or KI. Solvents which can be employed for the alkylation are, for example, hydrocarbons, such as benzene, toluene, petroleum ether, ketones, such as acetone, or alcohols, such as methanol, ethanol, isopropanol. It is also possible to operate without solvents, for example when an excess of the amine of Formula VI is utilized. The reaction temperatures required for optimum yield of product range between about −30° C. and about +160° C.

When the free alcohols are employed for alkylating the steroid amines of Formula IV, it is sometimes advantageous to heat the steroid amine with an excess of the alcohol in the presence of Raney nickel. Furthermore, the steroid amines can be alkylated by reaction with an aldehyde, for example formaldehyde, preferably with 30–37% aqueous formaldehyde, in the presence of formic acid, advantageously at temperatures between room temperature and the boiling temperature of the reaction mixture, suitably at about 100° C. At a temperaure of 100° C., reaction times between about 4 and 24 hours are usually required to complete the reaction.

For the production of the tertiary amines of Formula I, the alkylating conditions described in the literature, for example Houben-Weyl, loc. cit., pp. 108–112 and 618–639, can be employed.

According to this invention, the novel compounds can also be produced starting with steroids otherwise corresponding to Formula I, but which contain, in place of hydrogen atoms, at least one reducible group in the molecule. For example, the starting compounds can contain, in the position adjacent to the oxygen atom or nitrogen atom present in the side chain, a carbonyl or thiocarbonyl group. Such steroid esters or thioesters, or amides or thioamides, can be reduced to the desired final products, for example, by treatment with a borane, preferably diborane. The borane is normally produced in situ in the reaction solution, by employing as the reducing agent, for example, a mixture of $BF_3$ (e.g., in the form of the etherate) with $LiAlH_4$ or $NaBH_4$. It is also possible to introduce the borane into the reaction solution, which preferably contains more $BF_3$. The borane reduction is advantageously conducted in the presence of a solvent, for example, an ether, such as diethyl ether, diisopropyl ether, tetrahydrofuran, dioxane, or diethylene glycol dimethyl ether. The reaction temperatures can vary between about −30° C. and +150° C.

Acid amides containing a carbonyl group in the position adjacent to the N-atom, for example amides of 2-androsten-17β-yloxyacetic acid, of 3-(2-androsten-17β-yloxy)-propionic acid, or of 4-(2-androsten-17β-yloxy)-butyric acid, for example of 17β-dimethylaminocarbonylmethoxy-2-androstene, or N-acyl derivatives of 17β-(ω-N-alkylaminoalkyoxy)-2-androstenes, e.g., 17β-(2-N-formyl-N-ethylaminoethoxy)-2-androstene, can also be reduced with complex metal hydrides, especially $LiAlH_4$, suitably in the presence of an inert solvent, for example an ether, e.g., diethyl ether, tetrahydrofuran, dioxane; a glycol ether, e.g., ethylene glycol dimethyl ether, or in mixtures of these solvents. The reaction can be carried out at a temperature between about −30° C. and the boiling temperature of the solvent, preferably between 0 and 100° C.

Compounds of Formula I can also be produced by reducing the corresponding 2,3-episulfide, for example, 2α, 3α-epithio-17β-(2-diethylaminoethoxy) - androstane, e.g., with $LiAlH_4$, preferably in ether or tetrahydrofuran. A 2, 3-episulfide can also be reduced with zinc and acetic acid. Also, a thioenol ether of a 3-keto steroid otherwise corresponding to Formula I, for example, 3-benzylmercapto-17β-(2-diethylaminoethoxy)-2-androstene, can be reduced to the corresponding 2-androstene of Formula I by boiling for several hours with Raney nickel in acetone.

Steroids of Formula VII which can be employed as the starting compounds include those having in the 3-position a chlorine, bromine or iodine atom, or a free or functionally modified hydroxy group. The hydroxy group can be present, for instance, as an ester group or as a readily cleavable ether group, e.g., an acetal-type ether group, for example, a tetrahydropyranyl ether group. Preferred esters are the 3-sulfonic acid esters of the basic 17-substituted androstan-3-ols preferably those wherein the sulfonic acid group contains 1 to 10 carbon atoms, for example, the methane-sulfonates, ethanesulfonates, benzenesulfonates, and especially the p-toluenesulfonates. Carboxylic acid esters, e.g., wherein the carboxylic acid group contains 1 to 18, especially, 1 to 7, carbon atoms, are also suitable for the elimination reaction. Specific examples are the lower-alkanoates, e.g., formates, acetates, propionates, aryl esters, e.g., benzoates, and xanthates and carbonates.

The introduction of a 2(3)-position double bond by splitting off HZ can be accomplished at temperatures of from 0 to 300° C., preferably from 20 to 200° C. Although the splitting-off step can be effected already by a simple heating operation, for example by heating the 3-xanthates, 3-carbonates, or 3-benzoates, it is advantageous to add reagents which enhance the splitting-off process. When the alcohols VII (Z=OH) are employed as the starting compounds, suitable reagents are dehydrating agents, e.g., acids or Lewis acids, such as, for example, sulfuric acid, polyphosphoric acid, $P_2O_5$, oxalic acid, trifluoroacetic acid, p-toluenesulfonic acid, benzenesulfonic acid and, also dimethyl sulfoxide, potassium bisulfate and iodine. If the starting compounds employed are esters VII (Z=esterified OH) or halogenides VII (Z=Cl, Br or I), it is advantageous to add a base to neutralize the thus-split off HZ acid. Examples of such bases are pyridine, collidine, lutidine, quinoline, N,N-dimethylaniline, triethylamine, NaOH, and KOH. Neutral-reacting salts, e.g., LiCl, LiBr, are suitable as catalysts for the splitting-off step. The reaction can be conducted without or with an additional solvent. Suitable solvents are, for example, hydrocarbons, e.g., benzene, toluene and xylene; halogenated hydrocarbons, e.g., chloroform, carbon tetrachloride, 1,2-dichloroethane and chlorobenzene; sulfoxides, e.g., dimethyl sulfoxide; amides, e.g., dimethylformamide. Also an excess of the elimination agent, for example the added base, can serve as the solvent.

An especially preferred embodiment of this aspect of the process of this invention is heating a 3β-p-toluenesulfonate (VII, Z=β—p—$C_7H_7SO_2$—O—) with excess collidine. This reaction usually requires about 1 to 12 hours.

A base of Formula I can be converted into an acid addition salt thereof with an acid. Preferred are acids which yield physiologically acceptable acid addition salts. Both organic and inorganic acids can be employed, e.g., aliphatic, alicyclic, araliphatic, aromatic, or heterocyclic, mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, nicotinic acid, isonicotinic acid, methanesulfonic acid, ethanesulfonic acid, β-hydroxy-ethanesulfonic acid, p-toluenesulfonic acid, naphthalene-mono- and disulfonic acids, sulfuric acid, nitric acid, hydrohalic acids, such as hydrochloric acid or hydrobromic acid, or phosphoric acids, such as orthophosphoric acid. Other acids conventionally used for such purposes can be used for isolation, purification and identification purposes.

A base of Formula I can be produced from an acid addition salt thereof, preferably a purified acid addition salt, by treating the latter, advantageously in an aqueous solution, with a strong base, such as NaOH or KOH. The free base can be taken up in an organic solvent, e.g., diethyl ether, washed with water containing sodium bicarbonate, the solution dried and the solvent then evaporated or distilled therefrom to yield the isolated free base.

The compounds of this invention exhibit good cholesterol blood-level lowering effects. For example, an oral administration of 10 mg./kg. of the hydrochloride of 17β-2-(diethylaminoethoxy) - 2 - androstene lowered the cholesterol level in the serum by 29% in rats. For methodology, see Counsell et al., J. Med. Pharm. Chem. 5, 720, 1224 (1962).

The compounds of this invention also exhibit antifungal activity. For example, the above-named hydrochloride exhibited a fungistatic or fungicidal effect against the following microorganisms: *Aspergillus fumigatus, Aspergillus niger, Candida albicans, Candida parapsilosis, Epidermophyton floccosum, Geotrichon, Histoplasma capsulatum, Microsporum audouini, Microsporum candidum,* Mucor, *Nocardia asteroides,* Penicillium, *Trichophyton mentagrophytes* and *Trichophyton rubrum.*

The compounds of this invention can be employed as fungistats or fungicides, bacteriostats or bactericides, as well as intermediates for the preparation of other useful compounds by introduction of functional groups in the 1 and 1 or 2-position and/or by conversion of the amino group to another functional group, employing techniques known in the art.

The novel compounds can be employed in a mixture with solid, liquid and/or semi-liquid excipients in the human or veterinary medicine. Pharmaceutically acceptable carrier substances which can be used are the organic or inorganic materials suitable for parenteral, enteral, or topical application, conventionally used for such purposes, which do not react with the novel compounds, such as, for example, water, vegetable oils, polyethylene glycols, gelatin, lactose, amylose, magnesium stearate, talc, Vaseline, cholesterol. Especially suitable for parenteral application are solutions, preferably oily or aqueous solutions, as well as suspensions, emulsions, or implants. For enteral application, suitable forms include tablets, dragees, solutions, syrups, and juices, and for topical application, suitable forms include salves, lotions, creams, aerosols and powders. The above-mentioned preparations can optionally be sterilized or mixed with auxiliary agents, such as preservatives, stabilizers, wetting agents, salts for altering the osmotic pressure, buffers, colorings, flavorings and or aromatous substances.

The compounds of this invention are useful for lowering serum cholesterol levels. For this purpose, they are preferably administered in successive dosages of, e.g., 2 to 300 mg. per dose orally.

For their anti-bacterial or anti-fungal activity, they can be employed topically or administered orally or parenterally.

The compounds of this invention are generally administered together with an amount of a pharmaceutically acceptable carrier which provides a convenient unit dosage size, e.g., 1 to 5,000 mg. of carrier per unit dose of the compound of Formula I. Oral administration is preferred, particularly in tablet or capsule form.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The temperatures in the following examples are set forth in degrees centigrade.

EXAMPLE 1

12.3 g. of 2-androsten-17β-ol are dissolved in 90 ml. of absolute dimethylformamide and 120 ml. of absolute toluene and mixed, with stirring, with 72 ml. of 20% NaH suspension in paraffin oil (B.P. 360°). After 15 minutes, 13 ml. of 2-diisopropylaminoethyl chloride in 30 ml. of absolute toluene is added to the reaction mixture, and the latter is further agitated for 15 hours at room temperature. Then, the reaction mixture is filtered, the residue is washed with benzene, and the filtrate and washing liquid are evaporated. The residue is taken up in 500 ml. of petroleum ether (B.P. 40–60°) and mixed with 100 ml. of ether saturated with hydrogen chloride. The thus-precipitated 17β-(2-diisopropylaminoethoxy)-2-androstene hydrochloride is vacuum-filtered, washed with ether, and recrystallized from acetone; M.P. 191–194°.

Analogously, by employing the following compounds, or the corresponding bromides or iodides:

2-dimethylaminoethyl chloride
2-diethylaminoethyl chloride
2-di-n-propylaminoethyl chloride
2-pyrrolidinoethyl chloride
2-piperidinoethyl chloride
2-hexamethyleniminoethyl chloride
2-morpholinoethyl chloride
2-piperazinoethyl chloride
3-dimethylaminopropyl chloride
3-diethylaminopropyl chloride
3-di-n-propylaminopropyl chloride 3-diisopropylaminopropyl chloride
3-pyrrolidinopropyl chloride
3-piperidinopropyl chloride
3-hexamethyleniminopropyl chloride
3-piperazinopropyl chloride
1-methyl-2-dimethylaminoethyl chloride
1-methyl-2-diethylaminoethyl chloride
1-methyl-2-morpholinoethyl chloride
4-dimethylaminobutyl chloride
4-diethylaminobutyl chloride
2-methyl-3-dimethylaminopropyl chloride the compounds set forth below are produced:

17β-(2-dimethylaminoethoxy)-2-androstene, hydrochloride, M.P. 219–221°
17β-(2-diethylaminoethoxy)-2-androstene, hydrochloride, M.P. 235–236°
17β-(2-di-n-propylaminoethoxy)-2-androstene
17β-(2-pyrrolidinoethoxy)-2-androstene
17β-(2-piperidinoethoxy)-2-androstene
17β-(2-hexamethyleniminoethoxy)-2-androstene, hydrochloride, M.P. 200–202°
17β-(2-morpholinoethoxy)-2-androstene, hydrochloride, M.P. 228–230°
17β-(2-piperazinoethoxy)-2-androstene
17β-(3-dimethylaminopropoxy)-2-androstene
17β-(3-diethylaminopropoxy)-2-androstene, hydrochloride, M.P. 198–200°
17β-(3-di-n-propylaminopropoxy)-2-androstene
17β-(3-diisopropylaminopropoxy)-2-androstene
17β-(3-pyrrolidinopropoxy)-2-androstene
17β-(3-piperidinopropoxy)-2-androstene
17β-(3-hexamethyleniminopropoxy)-2-androstene
17β-(3-piperazinopropoxy)-2-androstene
17β-(1-methyl-2-dimethylaminoethoxy)-2-androstene
17β-(1-methyl-2-diethylaminoethoxy)-2-androstene
17β-(1-methyl-2-morpholinoethoxy)-2-androstene
17β-(4-dimethylaminobutoxy)-2-androstene
17β-(4-diethylaminobutoxy)-2-androstene
17β-(2-methyl-3-dimethylaminopropoxy)-2-androstene.

EXAMPLE 2

2.74 g. of 2-androsten-17β-ol is dissolved in 100 ml. of absolute xylene and mixed with 14.4 ml. of a 20% NaH suspension in paraffin oil, diluted with 50 ml. of absolute xylene. The reaction mixture is boiled for 90 minutes under $N_2$, cooled to room temperature, and, under agitation, 6 g. of 2-bromo-ethyl-diethyl-ammonium bromide is introduced in batches. Now, the reaction mixture is boiled for 150 minutes and, after cooling, poured into 200 ml. of ice water. The mixture is mixed with 200 ml. of chloroform and extracted. The extract is washed with water, dried, concentrated by evaporation, taken up in 100 ml. of petroleum ether, and mixed with 20 ml. of ethereal hydrochloric acid, thus obtaining 17β-(2-diethyl-aminoethoxy)-2-androstene hydrochloride, M.P. 235–236°.

In place of xylene, it is also possible to employ cyclohexane, benzene, toluene, or dioxane as the solvent; in this case, the boiling periods are extended in each instance, corresponding to the boiling point of the solvent.

EXAMPLE 3

30 ml. of liquid ammonia is mixed with small potassium fragments until the blue color remains. Then, a trace of iron (III) nitrate and another 500 mg. of potassium are added thereto, and the reaction mixture is stirred for 30 minutes at −70°. Then, 2.7 g. of 2-androsten-17β-ol is introduced, and the mixture stirred for another 30 minutes. The ammonia is driven off by a nitrogen stream, and the residue is taken up in 15 ml. of absolute dioxane and mixed dropwise, at room temperature, with a solution of 1.8 g. of 2-diethylaminoethyl bromide in 5 ml. of absolute dioxane. The reaction solution is boiled under a nitrogen atmosphere for 10 hours, diluted with 30 ml. of dioxane, the KBr is filtered off, and the filtrate is evaporated to dryness. The crude product is dissolved in petroleum ether and mixed with ethereal hydrochloric acid, thus obtaining 17β-(2-diethylaminoethoxy)-2-androstene hydrochloride, M.P. 235–236°.

In place of 2-diethylaminoethyl bromide, it is also possible to employ equivalent amounts of 2-diethylaminoethyl iodide, or the methanesulfonate, ethanesulfonate, benzene-sulfonate, p-toluene-sulfonate, or 2-naphthalene-sulfonate of 2-diethylaminoethanol.

EXAMPLE 4

A mixture of 2.7 g. of 2-androsten-17β-ol, 1.2 g. of 2-diethylaminoethanol, 2.66 g. of p-toluenesulfonic acid monohydrate, and 150 ml. of absolute toluene is boiled for 3 hours on a water trap. The reaction mixture is allowed to cool down, and the solution is washed with $NaHCO_3$-solution and water, dried with sodium sulfate, and evaporated, thus obtaining 17β-(2-diethylaminoethoxy)-2-androstene; hydrochloride, M.P. 235–236°.

Analogously, the basic [alkaline] 2-androstene-17-ethers set forth in Example 1 are obtained from 2-androsten-17β-ol and the corresponding amino alcohols.

EXAMPLE 5

30 g. of 2-dimethylaminoethanol is added dropwise, under stirring and a nitrogen stream, into a boiling solution of 2 g. of 2-androsten-17α-ol-p-toluenesulfonate (obtainable by reducing 2-androsten-17-one with $NaBH_4$, separation of the epimers by chromatography, and esterification with p-toluene-sulfochloride/pyridine) in 100 ml. of benzene; then, the reaction mixture is boiled for another 1½ hours. After cooling, the mixture is diluted with ether and washed with water. From the residue of the dried solution, 17β-(2-dimethylaminoethoxy)-2-androstene is obtained; hydrochloride, M.P. 219–221°.

Analogously, the basic 2-androstene-17-ethers mentioned in Example 1 are obtained with the corresponding amino alcohols.

EXAMPLE 6

1.2 g. of sodium hydride is added to a mixture of 6 g. of 2-diethylaminoethanol and 200 ml. of dry xylene, and the suspension is heated under a nitrogen atmosphere for 1 hour to the boiling temperature. Under agitation, a solution of 2 g. of 17α-bromo-2-androstene (obtainable from 2-androsten-17β-ol-p-toluenesulfonate with KBr in tetrahydrofuran) in 50 ml. of dry xylene is added dropwise to the boiling mixture, and boiling is continued for another 7 hours. After cooling, some methanol is carefully added to the reaction mixture, and the latter is then diluted with ether and mixed with water. The usual working-up process yield 17β-(2-diethylaminoethoxy)-2-androstene; hydrochloride, M.P. 235–236°.

EXAMPLE 7

Under cooling, 6.3 g. of 17β-(2-aminoethoxy)-2-androstene (obtainable from 2-androsten-17β-ol by reaction with 2-chloroethanol in the presence of NaH to form 17β-(2-hydroxyethoxy)-2-androstene, reaction with $SOCl_2$/pyridine to 17β-(2-chloroethoxy)-2-androstene and heating thereof with ethanolic $NH_3$ to 160° in an autoclave) is added to a mixture of 5 g. of 90% formic acid and 3.8 g. of 35% aqueous formaldehyde solution. Under gradual heating, the evolution of carbon dioxide commences. Thereafter, the reaction mixture is heated for 12 hours on a steam bath. After adding 2 ml. of hydrochloric acid, the formic acid and the formaldehyde are distilled off. By crystallization from acetone, 17β-(2-dimethylaminoethoxy)-2-androstene hydrochloride is obtained, M.P. 219–221°.

Analogously, 17β-(3-dimethylaminopropoxy)-2-androstene is obtained from 17β-(3-aminopropoxy)-2-androstene (obtainable by cyanoethylation of 2-androsten-17β-ol and subsequent reduction); and 17β-(4-dimethylaminobutoxy)-2-androstene is obtained from 17β-(4-aminobutoxy)-2-androstene (producible by reacting the Na-derivative of 2-androsten-17β-ol with 4-bromobutyric acid nitrile and subsequent reduction).

EXAMPLE 8

0.3 g. of 17β-(2-ethylaminoethoxy)-2-androstene (obtainable by reacting the Na-compound of 2-androsten-17β-ol with bromoacetaldehyde diethylacetal, hydrolysis with dilute hydrochloric acid to form 17β-formylmethoxy-2-androstene, reaction with ethylamine to the Schiff base, and reduction with NaBH₄) is heated, together with 0.35 g. of 90% formic acid and 0.3 g. of 35% formalin for 18 hours on a steam bath. The reaction mixture is diluted with water, brought to a pH of 3 with hydrochloric acid, and shaken out with ether. The aqueous phase is then mixed with solution of sodium hydroxide until the reaction is alkaline, and extracted with ether. After drying and evaporation, 17β - (2-N-methyl-N-ethylaminoethoxy)-2-androstene is obtained. To produce the hydrochloride, 0.1 g. of the free base is dissolved in a small amount of methanol, and the solution is mixed with an excess of ethereal hydrochloric acid.

EXAMPLE 9

0.4 g. of crude 17β-(2-ethylaminoethoxy)-2-androstene is boiled in 8 ml. of ethanol with 0.12 g. of ethyl bromide for 5 hours. The reaction mixture is concentrated by evaporation, the residue is chromatographed on basic aluminum oxide, and eluted with benzene/chloroform, thus producing 17β-(2-diethylaminoethoxy)-2-androstene; hydrochloride, M.P. 235–236°.

Analogously, the corresponding amino ethers of 2-androsten-17β-ol are obtained from 17β-(2-aminoethoxy)-2-androstene or 17β-(3-aminopropoxy)-2-androstene, respectively, by reaction with the stoichiometric amounts of methyl iodide, diethyl sulfate, n-propyl bromide, isopropyl iodide, 1,4-dibromobutane, 1,5-dibromopentane, 1,6-dibromohexane, or bis(2-bromoethyl)ethyl, respectively.

EXAMPLE 10

A solution of 3 g. of 17β-(2-chloroethoxy)-2-androstene (obtainable by reacting the Na-compound of 2-androsten-17β-ol with 1-bromo-2-chlorethane) in 150 ml. of ethanol is heated with a five-fold excess of diethylamine in a bomb tube for 16 hours to 100°. Then, the reaction solution is concentrated by evaporation; the residue is mixed with water and extracted with ether. The extract is washed with water, dried over sodium sulfate, the ether is evaporated, and the product is chromatographed on silica gel. By means of chloroform, 17β-(2-diethylaminoethoxy)-2-androstene is eluted; hydrochloride, M.P. 235–236°.

Analogously, the corresponding basic ethers of 2-androsten-17β-ol are obtained from 17β-(2-bromoethoxy)-2-androstene or 17β-(3-bromopropoxy)-2-androstene, or from the corresponding chlorine, iodine, or p-toluenesulfonyloxy compounds by reaction with dimethylamine, diethylamine, di-n-propylamine, diisopropylamine, pyrrolidine, piperidine, hexamethylenimine, morpholine or piperazine.

EXAMPLE 11

5 g. of 17β-(2-chloroethoxy)-2-androstene is dissolved in 50 ml. of dioxane and, after the addition of 10 ml. of diethylamine, heated for 5 hours in a tube to 100°. Then, the reaction mixture is cooled, diluted with 500 ml. of water, worked up as described in Example 10, and the product obtained is 17β-(2-diethylaminoethoxy)-2-androstene hydrochloride, M.P. 235–236°.

EXAMPLE 12

3 g. of 17β-pyrrolidinocarbonylmethoxy-2-androstene (obtainable from 2-androsten-17β-ol and chloroacetic acid pyrrolidide in the presence of NaH) in 45 ml. of absolute ether is added dropwise at 0° into a suspension of 700 mg. of LiAlH₄ in 30 ml. of absolute ether. The reaction mixture is boiled for 3 hours, decomposed under ice cooling with 10 ml. of water, and the thus-obtained reaction mixture is added to 60 ml. of NH₄Cl-solution and extracted with ether. After the ether has been removed by evaporation, 17β-(2-pyrrolidinoethoxy)-2-androstene is obtained.

EXAMPLE 13

2 g. of 17β-diethylaminocarbonylmethoxy-2-androstene (producible from 2-androsten-17β-ol and chloroacetic acid diethylamide) is dissolved in 70 ml. of absolute dioxane and added to a suspension of 1 g. of LiAlH₄ in 35 ml. of absolute dioxane. After boiling for 18 hours, the excess of LiAlH₄ is destroyed with aqueous dioxane, and the mixture is boiled with 0.8 ml. of a 20% solution of sodium hydroxide and mixed with a small amount of water. The thus-precipitated salts are filtered off, washed with dioxane, and the crude 17β-(2-diethylaminoethoxy)-2-androstene isolated from the organic phase is dissolved in methanol and precipitated as the hydrochloride with ethereal hydrochloric acid; M.P. 235–236°. The free base is obtained therefrom by the addition of 1 N sodium hydroxide solution up to a strongly alkaline reaction and subsequent precipitation with water.

Analogously, the corresponding amino ethers of 2-androsten-17β-ol are obtainable with LiAlH₄ from the following compounds:

17β-dimethylaminocarbonylmethoxy-2-androstene
17β-di-n-propylaminocarbonylmethoxy-2-androstene
17β-diisopropylaminocarbonylmethoxy-2-androstene
17β-pyrrolidinocarbonylmethoxy-2-androstene
17β-piperidinocarbonylmethoxy-2-androstene
17β-hexamethyleniminocarbonylmethoxy-2-androstene
17β-morpholinocarbonylmethoxy-2-androstene
17β-piperazinocarbonylmethoxy-2-androstene
17β-(2-dimethylaminocarbonylethoxy)-2-androstene
17β-(2-diethylaminocarbonylethoxy)-2-androstene
17β-(2-di-n-propylaminocarbonylethoxy)-2-androstene
17β-(2-diisopropylaminocarbonylethoxy)-2-androstene
17β-(2-pyrrolidinocarbonylethoxy)-2-androstene
17β-(2-piperidinocarbonylethoxy)-2-androstene
17β-(2-hexamethyleniminocarbonylethoxy)-2-androstene
17β-(2-morpholinocarbonylethoxy)-2-androstene
17β-(2-piperazinocarbonylethoxy)-2-androstene

EXAMPLE 14

A solution of 10 ml. of boron trifluoride etherate and 500 mg. of 17β-(2-N-acetyl-N-ethylaminoethoxy)-2-androstene (obtainable by acetylation of (2-ethylaminoethoxy)-2-androstene) in 25 ml. of tetrahydrofuran is added within 30 minutes, under a nitrogen atmosphere, to an ice-cooled slurry of 400 mg. of LiAlH₄ in 25 ml. of tetrahydrofuran. The reaction mixture is stirred under ice cooling for another hour, and is then boiled for one hour. After cooling, ethyl acetate and 50 ml. of 2 N hydrochloric acid are added to the reaction mixture; then, the latter is thoroughly stirred, made alkaline with NaHCO₃, and extracted with chloroform. The reaction mixture is evaporated, dissolved in petroleum ether, ethereal hydrochloric acid is added thereto, and the product thus obtained is 17β-(2-diethylaminoethoxy)-2-androstene hydrochloride, M.P. 235–236°.

EXAMPLE 15

2 g. of morpholinoacetic acid-(2-androsten-17β-yl) ester (obtainable from morpholinoacetic acid and 2-androsten-17β-ol in the presence of diccylohexyl carbodiimide) is dissolved in 100 ml. of tetrahydrofuran containing 21 g. of boron trifluoride etherate, and the solution is added dropwise during the course of 30 minutes and under agitation at 0° under N₂ to a mixture of 0.37 g. of NaBH₄ in 25 ml. of diethylene glycol dimethyl ether. The reaction mixture is allowed to stand for 3 hours under cooling and thereafter boiled for one hour. After cooling, some methanol is added, and the reaction mixture is acidified with dilute hydrochloric acid and diluted with water. After extraction with ether, the reaction mixture is washed neutral and dried, and the residue is chromatographed on aluminum oxide. Elution with petroleum ether results in 17β-(2-morpholinoethoxy)-2-androstene. Hydrochloride, M.P. 228–230°.

Analogously, from the (2-androsten-17β-yl)-esters of each of the following acids:

dimethylaminoacetic acid;
diethylaminoacetic acid;
di-n-propylaminoacetic acid;
diisopropylaminoacetic acid;
pyrrolidinoacetic acid;
piperidinoacetic acid;
hexamethyleniminoacetic acid;
piperazinoacetic acid;
3-(dimethylamino)-propionic acid;
3-(diethylamino)-propionic acid;
3-(di-n-propylamino)-propionic acid;
3-(diisopropylamino)-propionic acid;
3-(pyrrolidino)-propionic acid;
3-(piperidino)-propionic acid;
3-(hexamethylenimino)-propionic acid;
3-(morpholino)-propionic acid; and
3-(piperazino)-propionic acid;

the corresponding basic 17-ethers of 2-androsten-17β-ol are obtained.

EXAMPLE 16

15.2 g. of 17β-(2-diethylaminoethoxy)-androstan-3β-ol-3-p-toluenesulfonate (obtainable by reacting androstane-3β,17β-diol-3-tetrahydropyranyl ether with NaH and 2-diethylaminoethyl chloride to 17β-(2-diethylaminoethoxy)-androstan-3β-ol-3-tetrahydropyranyl ether, splitting with sulfuric acid to 17β-(2-di-ethylaminoethoxy)-androstan-3β-ol and esterification with p-toluenesulfonic acid chloride in pyridine) is boiled in 300 ml. of collidine for 5 hours. Thereafter, the collidine is distilled off under reduced pressure, the residue is taken up in ether, and shaken out with 2 N sodium hydroxide solution. Then, the ether phase is mixed with 100 ml. of ether saturated with hydrogen chloride, thus obtaining 17β-(2-diethylaminoethoxy)-2-androstene hydrochloride, M.P. 235–236° (from acetone).

Analogously, by heating with collidine, the corresponding basic 2-androstene-17-ethers are produced from the 3-p-toluene-sulfonic acid esters of:

17β-(2-dimethylaminoethoxy)-androstan-3β-ol
17β-(2-di-n-propylaminoethoxy)androstan-3β-ol
17β-(2-diisopropylaminoethoxy)-androstan-3β-ol
17β-(2-pyrrolidinoethoxy)-androstan-3β-ol
17β-(2-piperidinoethoxy)-androstan-3β-ol
17β-(2-hexamethyleniminoethoxy)-androstan-3β-ol
17β-(2-morpholinoethoxy)-androstan-3β-ol
17β-(2-piperazinoethoxy)-androstan-3β-ol
17β-(3-dimethylaminopropoxy)-androstan-3β-ol
17β-(3-diethylaminopropoxy)-androstan-3β-ol
17β-(3-di-n-propylaminopropoxy)-androstan-3β-ol
17β-(3-diisopropylaminopropoxy)-androstan-3β-ol
17β-(3-pyrrolidinopropoxy)-androstan-3β-ol
17β-(3-piperidinopropoxy)-androstan-3β-ol
17β-(3-hexamethyleniminopropoxy)-androstan-3β-ol
17β-(3-piperazinopropoxy)-androstan-3β-ol
17β-(1-methyl-2-dimethylaminoethoxy)-androstan-3β-ol
17β-(1-methyl-2-diethylaminoethoxy)-androstan-3β-ol
17β-(1-methyl-2-morpholinoethoxy)-androstan-3β-ol
17β-(4-dimethylaminobutoxy)-androstan-3β-ol
17β-(4-diethylaminobutoxy)-androstan-3β-ol
17β-(2-methyl-3-dimethylaminopropoxy)-androstan-3β-ol In place of the p-toluenesulfonates, it is also possible to employ the corresponding 2-chloro-, 2-bromo- or 2-iodo-compounds, or the corresponding methane- or benzenesulfonates.

EXAMPLE 17

0.8 ml. of a 1-molar solution of potassium tert.-butylate is added to a solution of 410 mg. of 3α-chloro-17β-(2-diethylaminoethoxy)-androstane (obtainable from 17β-(2-diethylaminoethoxy)-androstane-3β-ol tosylate and KCl in tetrahydrofuran) in 20 ml. of tert.-butanol. The reaction mixture is boiled for 16 hours, worked up, and the crude product is chromatographed in basic Al₂O₃. By means of benzene, 17β-(2-diethylaminoethoxy)-2-androstene is eluted. Hydrochloride, M.P. 235–236°.

EXAMPLE 18

A solution of 1 g. of the methanesulfonate of 17β-(2-diethylaminoethoxy)-androstan-3β-ol, 1 g. of potassium acetate, and 20 ml. of acetic acid is boiled for 9 hours and then concentrated to dryness by evaporation. The reaction mixture is extracted with ether, the ether solution is dried over sodium sulfate and evaporated, and the residue is boiled for 2 hours with 20 ml. of 5% ethanolic KOH. The crude product obtained after working up the reaction mixture is chromatographed on basic Al₂O₃; the main product obtained, 17β-(2-diethylaminoethoxy)-2-androstene, is eluted with benzene; hydrochloride, M.P. 235–236°. In addition thereto, a small amount of 17β-(2-diethylaminoethoxy)-androstan-3α-ol is produced.

EXAMPLE 19

One gram of the benzenesulfonate of 17β-(2-diethylaminoethoxy)-androstan-3β-ol is dissolved in 30 ml. of benzene and adsorbed on 100 g. of basic Al₂O₃. Another 10 ml. of benzene is introduced into the column, and the latter is allowed to stand, sealed, for 18 hours at room temperature. Elution with 300 ml. of benzene yields, as the main product, 17β-(2-diethylaminoethoxy)-2-androstene. In addition thereto, small amounts of 17β-(2-diethylaminoethoxy)-androstan-3α-ol and 17β-(2 - diethylaminoethoxy)-androstan-3β-ol is produced.

EXAMPLE 20

100 mg. of 17β-(2-diethylaminoethoxy)-androstan-3β-ol is allowed to stand overnight at room temperature with 1 ml. of pyridine and 0.11 ml. of POCl₃. The reaction mixture is decomposed with water under agitation, extracted with ether, separated, the ether layer washed with water, dried, and evaporated. The thus-obtained crude 17β-(2-diethylaminoethoxy)-2-androstene is purified by chromatography on basic Al₂O₃. Hydrochloride, M.P. 235–236°.

Analogously, the corresponding 17β - substituted 2-androstenes are obtained from the 17β-substituted androstan-3β-ols set forth in Example 16.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The following are examples of suitable pharmaceutical compositions according to the invention (the percentages are given by weight):

EXAMPLE 21

| Salve: | Percent |
| --- | --- |
| 17β-(2 - diethylaminoethoxy)-2-androstene hydrochloride | 0.1 |
| Lanolin, anhydrous | 2.0 |
| Thickly liquid paraffin | 10.0 |
| Vaseline, white | Ad 100.0 |

EXAMPLE 22

Salve: Percent
- 17β-(2 - diethylaminoethoxy)-2-androstene hydrochloride — 0.1
- Cetyl alcohol — 2.4
- Lanolin, anhydrous — 1.0
- Thickly liquid paraffin — 15.0
- Vaseline, white — Ad 100.0

EXAMPLE 23

Cream: Percent
- 17β-(2 - diethylaminoethoxy)-2-androstene hydrochloride — 0.1
- Cetyl alcohol — 9.0
- Thickly liquid paraffin — 3.0
- Glycerin monostearate — 2.0
- Propylene glycol monostearate — 2.0
- Glycerol — 2.0
- Extremely finely divided silicic acid — 0.1
- Petroleum jelly — 10.0
- Polyoxyethylene sorbitan monopalmitate — 30.0
- p-Hydroxybenzoic acid methyl ester — 0.065
- p-Hydroxybenzoic acid propyl ester — 0.035
- Propylene glycol — 3.0
- Water — Ad 100.0

EXAMPLE 24

Lotion: Percent
- 17β-(2 - diethylaminoethoxy)-2-androstene hydrochloride — 0.1
- Thickly liquid paraffin oil — 10.0
- Ethanol — 2.0
- Glycerol — 1.0
- Propylene glycol — 2.0
- Sorbic acid — 0.15
- Fatty alcohol polyglycol ether — 2.0
- Mixture of cetylstearyl alcohol and sodium salt of cetylstearyl sulfuric acid and nonionic emulsifier — 0.5
- Lily of the valley perfume oil — 0.01
- Water — Ad 100.0

EXAMPLE 25

The salve of Example 21 is repeated except that the weight percent of 17β-(2-diethylaminoethoxy)-2-androstene hydrochloride is 0.075.

EXAMPLE 26

The cream of Example 23 is repeated except that the weight percent of 17β-(2-diethylaminoethoxy)-2-androstene hydrochloride is 0.12.

EXAMPLE 27

Solution for injections

A solution of 20 g. of 17β-(2-diethylaminoethoxy)-2-androstene hydrochloride in 19.98 litres of distilled water is prepared and filled into 2 ml. ampoules in such a manner that each ampoule contains 2 mg. of the active ingredient.

EXAMPLE 28

Tablets

Each tablet contains: Mg.
- 17β - (2 - diethylaminoethoxy) - 2 - androstene-hydrochloride — 2
- Lactose — 70
- Potato starch — 27
- Magnesium stearate — 2

EXAMPLE 29

Tablets

Each tablet contains: Mg.
- 17β - (2 - diethylaminoethoxy) - 2 - androstene-hydrochloride — 3
- Lactose — 85
- Potato starch — 12
- Talc — 2
- Magnesium stearate — 1

EXAMPLE 30

Coated tablets

Each tablet contains: Mg.
- 17β - (2 - diethylaminoethoxy) - 2 - androstene-hydrochloride — 2
- Lactose — 110
- Corn starch — 15
- Talc — 6

The coating consists of a mixture of cane sugar, talc, wheat starch, and tragacanth and weighs about 100 mg.

EXAMPLE 31

Sirup

The unit dosage contains: Mg.
- 17β - (2 - diethylaminoethoxy)-2 - androstene hydrochloride — 6
- Cane sugar — 300
- Glycerol (twice distilled) — 500
- p-Hydroxybenzoic acid methyl ester — 4
- p-Hydroxybenzoic acid propyl ester — 2
- Flavoring, as desired.
- Water (distilled) — 4,150

Instead of 17β-(2-diethylaminoethoxy)-2-androstene hydrochloride, other physiologically compatible acid addition salts of the same base as well as other compounds covered by Formula I and their physiologically compatible acid addition salts can be incorporated into similar pharmaceutical preparations.

What is claimed is:

1. A 2-androstene-17-ether of the formula $$O-C_nH_{2n}-NR_1R_2$$

wherein $n$ is 2, 3 or 4 and $R_1$ and $R_2$ are members of the group consisting of alkyl of 1 to 3 carbon atoms and, collectively with the nitrogen atom, pyrrolidino, piperidino, hexamethylenimino, piperazino and morpholino, and the physiologically acceptable acid addition salts thereof.

2. A compound of claim 1 wherein $n$ is 2 or 3.

3. A compound of claim 2 wherein $R_1$ and $R_2$ each are alkyl of 1 to 3 carbon atoms.

4. The compound of claim 1, 17β-(2-dimethylaminoethoxy)-2-androstene.

5. The compound of claim 1, 17β-(2-diethylaminoethoxy)-2-androstene.

6. The compound of claim 1, 17β-(2-di-n-propylaminoethoxy)-2-androstene.

7. The compound of claim 1, 17β-(2-diisopropylaminoethoxy)-2-androstene.

8. The compound of claim 1, 17β-(2-pyrrolidinoethoxy)-2-androstene.

9. The compound of claim 1, 17β-(2-piperidinoethoxy)-2-androstene.

10. The compound of claim 1, 17β-(2-hexamethyleniminoethoxy)-2-androstene.

11. The compound of claim 1, 17β-(2-morpholinoethoxy)-2-androstene.

12. The compound of claim 1, 17β-(2-piperazinoethoxy)-2-androstene.

13. The compound of claim 1, 17β-(3-dimethylaminopropoxy)-2-androstene.

14. The compound of claim 1, 17β-(3-diethylaminopropoxy)-2-androstene.

15. The compound of claim 1, 17β-(3-di-n-propylaminopropoxy)-2-androstene.

16. The compound of claim 1, 17β-(3-diisopropylaminopropoxy)-2-androstene.

17. The compound of claim 1, 17β-(3-pyrrolidinopropoxy)-2-androstene.

18. The compound of claim 1, 17β-(3-piperidinopropoxy)-2-androstene.

19. The compound of claim 1, 17β-(3-hexamethyleniminopropoxy)-2-androstene.

20. The compound of claim 1, 17β-(3-morpholinopropoxy)-2-androstene.

21. The compound of claim 1, 17β-(3-piperazinopropoxy)-2-androstene.

No references cited.

HENRY A. FRENCH, Primary Examiner

U.S. Cl. X.R.

260—239.55, 397.5; 424—241

UNITED STATES PATENT OFFICE
CERTIFICATE OF CORRECTION

Patent No. 3,637,666          Dated January 25, 1972

Inventor(s) Klaus Irmscher, Gerhard Cimbollek, Helmut Wahlig, Karl-Otto Freisberg, Herbert Nowak, and Andreas Garbe It is certified that error appears in the above-identified patent and that said Letters Patent are hereby corrected as shown below:

Column 1, line 7, after "Germany" insert -- assignors to Merck Patent Gesellschaft mit beschrankter Haftung, Darmstadt, West Germany --

After line 8, insert -- claims priority, application Germany, April 12, 1969, P 19 18 699.3 --

Signed and sealed this 17th day of October 1972.

(SEAL)
Attest:

EDWARD M. FLETCHER, JR.          ROBERT GOTTSCHALK
Attesting Officer          Commissioner of Patents